US 8,547,501 B2

(12) United States Patent
Ha et al.

(10) Patent No.: US 8,547,501 B2
(45) Date of Patent: Oct. 1, 2013

(54) BACKLIGHT ASSEMBLY AND DISPLAY APPARATUS HAVING THE SAME

(75) Inventors: Juhwa Ha, Asan-si (KR); Young-Ran Son, Miryang-si (KR); JoongHyun Kim, Asan-si (KR); Min-Young Song, Seoul (KR); Sang Hoon Lee, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 657 days.

(21) Appl. No.: 12/698,040

(22) Filed: Feb. 1, 2010

(65) Prior Publication Data

US 2011/0013119 A1 Jan. 20, 2011

(30) Foreign Application Priority Data

Jul. 16, 2009 (KR) ........................ 10-2009-0064994

(51) Int. Cl.
*G02F 1/1335* (2006.01)
(52) U.S. Cl.
USPC .............................................. 349/64; 349/61
(58) Field of Classification Search
USPC ......................................................... 349/64
See application file for complete search history.

(56) References Cited

U.S. PATENT DOCUMENTS

| 5,600,456 | A | * | 2/1997 | Maruyama et al. ........... 349/112 |
| 7,510,288 | B2 | | 3/2009 | Shin et al. |
| 2001/0046134 | A1 | * | 11/2001 | Masaki et al. ................ 362/339 |
| 2006/0250707 | A1 | | 11/2006 | Whitney et al. |
| 2006/0285353 | A1 | | 12/2006 | Kim |
| 2007/0035940 | A1 | | 2/2007 | Yao et al. |
| 2007/0115407 | A1 | * | 5/2007 | Richard et al. ................ 349/112 |
| 2010/0110337 | A1 | | 5/2010 | Shin et al. |

FOREIGN PATENT DOCUMENTS

| KR | 100618089 B1 | 8/2006 |
| KR | 1020060092629 A | 8/2006 |
| KR | 1020070092589 A | 9/2007 |
| KR | 1020070109125 A | 11/2007 |
| KR | 1020080078958 A | 8/2008 |
| WO | 2007/105895 A1 | 9/2007 |

* cited by examiner

*Primary Examiner* — Lucy Chien
(74) *Attorney, Agent, or Firm* — Innovation Counsel LLP

(57) ABSTRACT

A backlight assembly includes a light source generating light and a first optical member diffusing the light. The first optical member includes a first diffusion member provided on an exit surface of the first optical member, from which the light exits, to diffuse the light. The first diffusion member includes a plurality of edges each having a curved shape and extending between the exit surface and a vertex of the first diffusion member. Accordingly, the light exiting through the exit surface is effectively diffused by the edges of the first diffusion member.

20 Claims, 10 Drawing Sheets

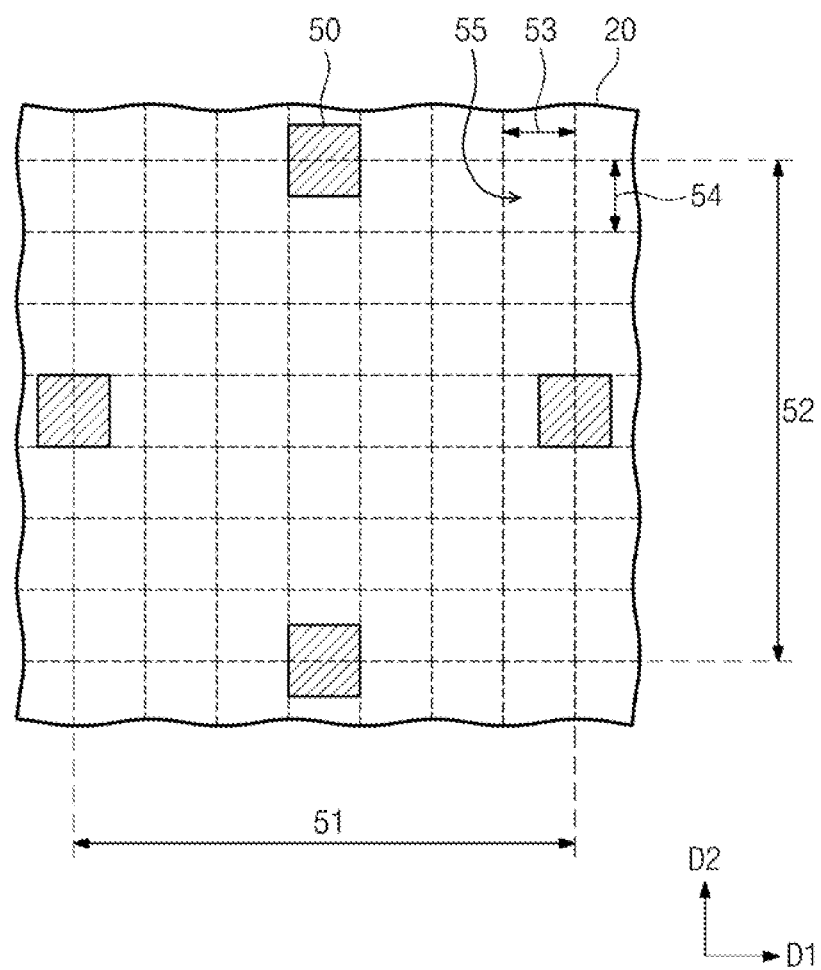

BACKLIGHT ASSEMBLY AND DISPLAY APPARATUS HAVING THE SAME

CROSS-REFERENCE TO RELATED APPLICATION

This application relies for priority upon Korean Patent Application No. 2009-64994 filed on Jul. 16, 2009, the contents of which are herein incorporated by reference in their entirety.

BACKGROUND

1. Field of the Invention

The present invention relates to a backlight assembly and a display apparatus having the same. More particularly, the present invention relates to a backlight assembly capable of providing substantially uniform light, and a display apparatus having the backlight assembly.

2. Description of the Related Art

In general, a display apparatus includes a backlight assembly that generates light and a display panel that displays an image by using the light from the backlight assembly. Accordingly, a backlight assembly capable of uniformly providing light to the entire display panel improves the display quality of the display apparatus.

Recently, light emitting diodes have become widely used as the light source in the backlight assembly of display apparatuses, instead of cold cathode fluorescent lamps. The cold cathode fluorescent lamp serves as a line light source, and, in contrast, the light emitting diode serves as a point light source. Because conventional optical sheets, such as diffuser panels, were developed based on the optical properties of the line light source provided by cold cathode fluorescent lamps, the luminance of the light supplied to a display panel from a backlight assembly that employs the point light source provided by light emitting diodes can become irregular when the conventional optical sheet, such as a diffuser panel, is used.

SUMMARY

In one aspect the invention provides a backlight assembly capable of providing substantially uniform light.

Another aspect of the invention also provides a display apparatus having the backlight assembly.

According to another aspect, a backlight assembly includes a light source that generates a light and a first optical member. The first optical member includes an incident surface to which the light is incident, an exit surface facing the incident surface, from which the light exits, and a first diffusion member disposed on the exit surface to diffuse the light. The first diffusion member includes a plurality of inclined surfaces that meet at a vertex, and the edges of the inclined surfaces extend between the exit surface and the vertex spaced apart form the exit surface and have curved shape.

According to another aspect, a display apparatus includes a backlight assembly that includes a light source that generates a light and a first optical member that diffuses the light, and a display panel receiving the light from the backlight assembly to display an image.

The first optical member includes an incident surface to which the light is incident, an exit surface facing the incident surface, from which the light exits, and a first diffusion member disposed on the exit surface to diffuse the light.

The first diffusion member includes a plurality of inclined surfaces that meet at a vertex and a plurality of edges of the inclined surfaces. The edges of the inclined surfaces extend between the exit surface and the vertex spaced apart from the exit surface and have a curved shape.

The optical member may diffuse the light from the backlight assembly by using the diffusion members provided on the incident and exit surfaces thereof in various shapes. In addition, when the backlight assembly includes a plurality of point light sources, the optical member may effectively diffuse the light emitted from the point light sources. Thus, the distance between the optical member and the light sources in the backlight assembly may be reduced, thereby reducing a volume of the backlight assembly.

In addition, the backlight assembly provides the light to the entire display apparatus uniformly, to thereby improve the image display quality of the display apparatus.

BRIEF DESCRIPTION OF THE DRAWINGS

The above and other advantages of the present invention will become readily apparent by reference to the following detailed description when considered in conjunction with the accompanying drawings wherein:

FIG. 7A is a partially enlarged plan view showing a reflection plate provided with light sources;

DESCRIPTION OF THE EMBODIMENTS

Figure 1:
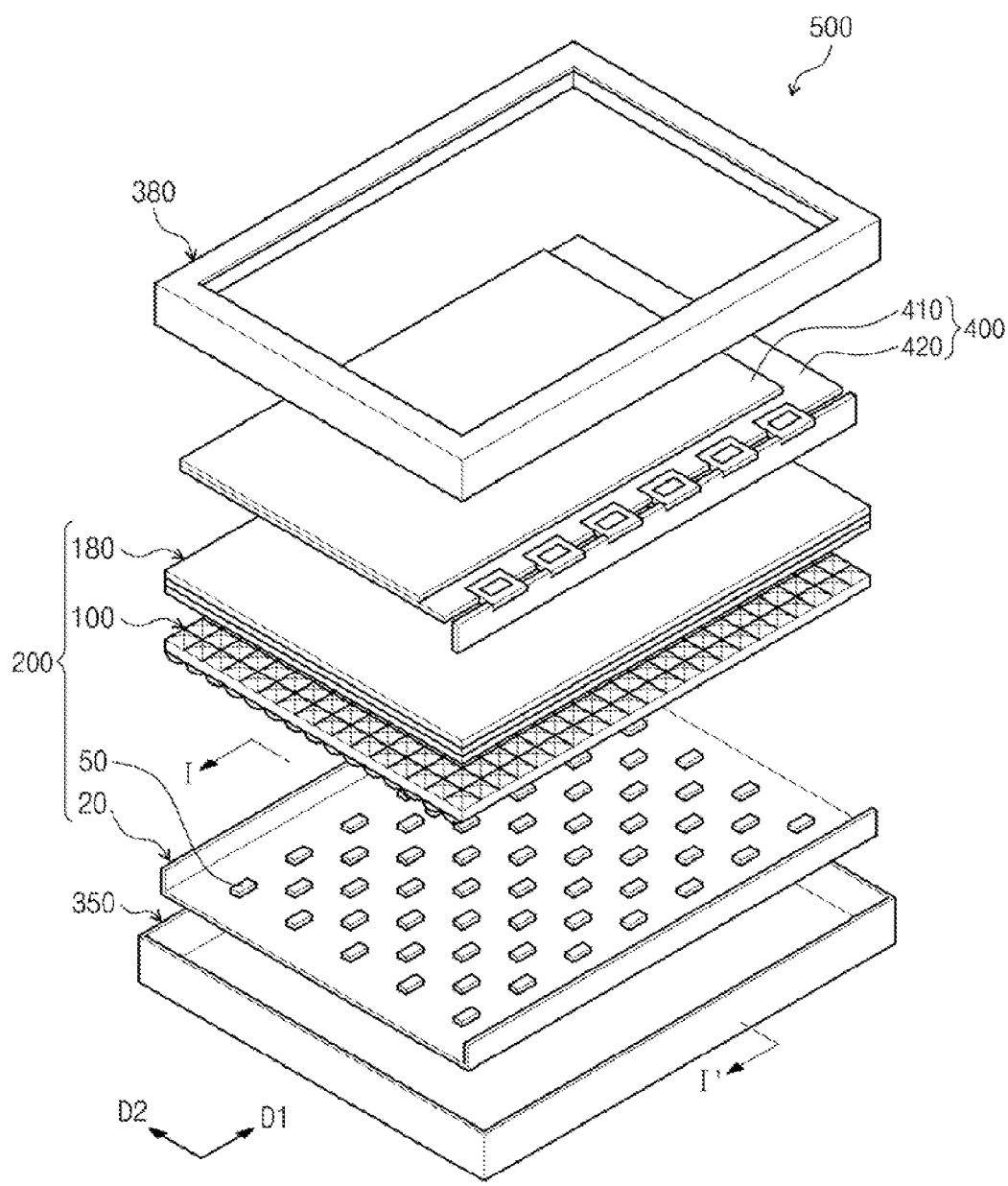
FIG. 1 is an exploded perspective view showing a display apparatus according to an exemplary embodiment.

It will be understood that when an element or layer is referred to as being "on," "connected to" or "coupled to" another element or layer, it can be directly on, connected or coupled to another element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below, depending on the orientation. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
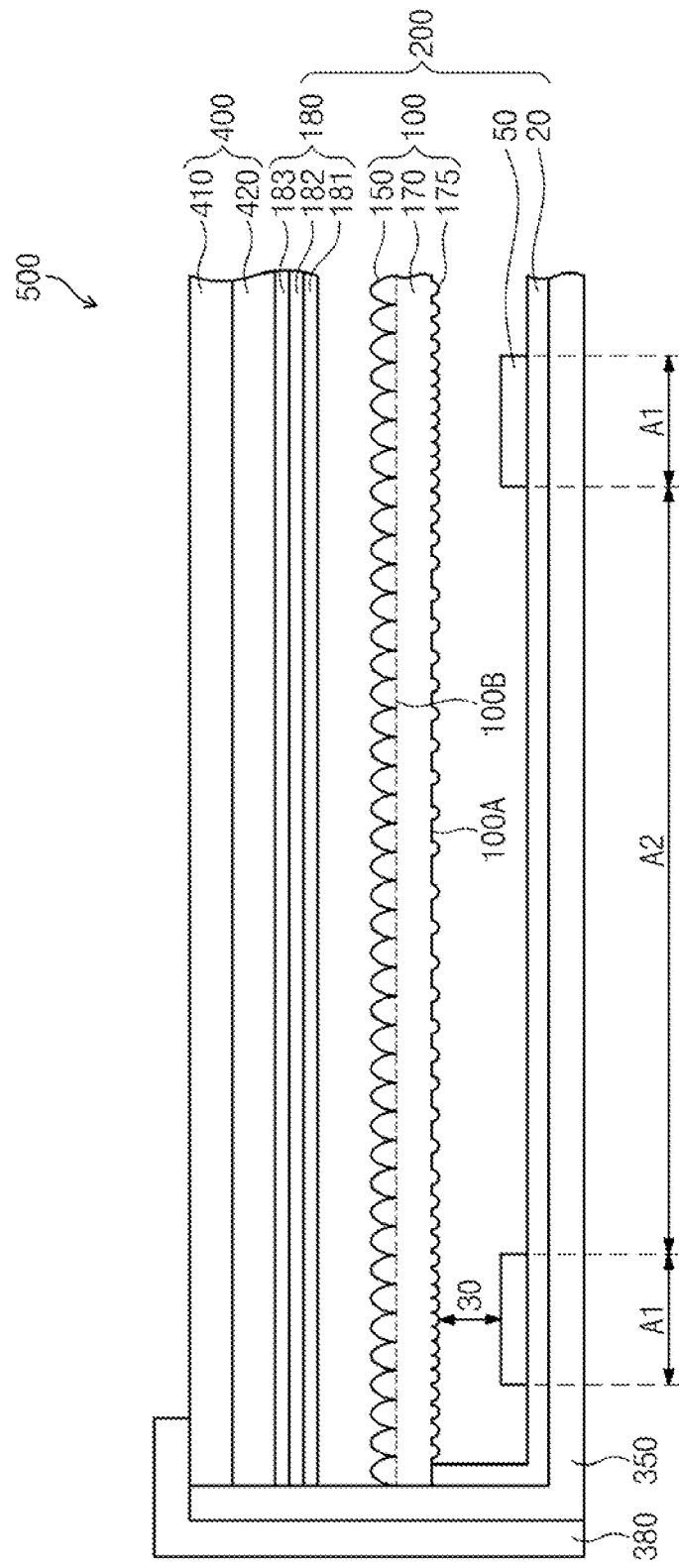
FIG. 2 is a sectional view taken along a line I-I' of FIG. 1.

FIG. 1 is an exploded perspective view showing a display apparatus according to an exemplary embodiment, and FIG. 2 is a sectional view taken along a line I-I' of FIG. 1.

Referring to FIGS. 1 and 2, a display apparatus 500 includes a backlight assembly 200 that generates light, and a display panel 400 that receives the light from the backlight assembly 200 to display an image. The display apparatus 500 also includes a top chassis 380 and a bottom chassis 350 that is coupled with the top chassis 380 to receive the backlight assembly 200 and the display panel 400 therein.

The backlight assembly 200 includes a reflection plate 20, a plurality of light sources 50 arranged on the reflection plate 20, a first optical member 100, and a second optical member 180.

Each of the light sources 50 has an approximately point-shaped light source. The light sources 50 are arranged in a first direction D1 and a second direction D2 that is substantially perpendicular to the first direction D1, and are spaced apart from each other. In the present exemplary embodiment, the light sources 50 are spaced apart from each other by a distance of about 25 millimeters in the first direction D1 and by a distance of about 28 millimeters in the second direction D2.

In addition, in the present exemplary embodiment, each of the light sources 50 may be a light emitting diode, but it should not be limited thereto or thereby. Each of the light sources 50 may be replaced with another point light source such as an organic light emitting diode.

The reflection plate 20 includes a material that reflects light, such as, for example, polyethylene terephthalate, aluminum, etc., and is disposed on a bottom of the bottom chassis 350. The reflection plate 20 reflects the light provided from the light sources 50 to enhance the amount of the light used in the display panel 400 to display the image.

The first optical member 100 is disposed above the light sources 50 to diffuse the light emitted from the light sources 50. The first optical member 100 includes a body 170, first diffusion members 150 provided on an exit surface 100B of the body 170, and second diffusion members 175 provided on an incident surface 100A of the body. The incident surface 100A may be defined as a surface to which the light emitted from the light sources 50 is incident, and the exit surface 100B may be defined as a surface from which the light incident to the body 170 exits. In the present exemplary embodiment, the first diffusion members 150 each have the same structure, thus one of the first diffusion members 150 will be described as a representative example of those members, and the same reference numerals are assigned to those components. In addition, in the present exemplary embodiment, the second diffusion members 175 all have the same structure, thus one of the second diffusion members 175 will be described as a representative example of those members, and the same reference numerals are assigned to those components.

Each of the first diffusion members 150 has a polyhedron shape of which a bottom surface makes contact with the exit surface 100B and inclined surfaces are connected with the bottom surface. The inclined surfaces are connected with one vertex spaced apart from the bottom surface, and the edges where two adjacent inclined surfaces meet each other have a curved shape. The first diffusion member 150 diffuses the light exiting to the exterior after sequentially passing through the body 170 and the exit surface 100B. The first diffusion member 150 will be described in more detail below with reference to FIGS. 3 to 5.

The second diffusion members 175 are provided on the incident surface 100A. Each of the second diffusion members 175 has an embossed shape that protrudes from the incident surface 100A. Accordingly, the light emitted from the light sources 50 and passing through the incident surface 100A may be diffused by a curved surface of the second diffusion member 175.

The number of the second diffusion members 175, and the spacing between second diffusion members 175, provided on the incident surface 100A depends on the positions of the light sources 50. For example, in FIG. 2, the area corresponding to the positions of the light sources 50 is defined as a first area A1, and an area corresponding to the area between two light sources adjacent to each other is defined as a second area A2. The number of the second diffusion members 175 positioned in the second area A2 increases as the second diffusion members 175 are spaced apart from a center of the second area A2. In other words, the second diffusion members 175 are spaced farther apart in the second area than in the first area, and the space between each second diffusion member is greatest in the center of the second area and decrease toward the first area.

In general, increasing the distance between light sources and optical members that diffuse the light emitted from the light sources increases the amount of the light that travels in different directions, and thus the light diffusion effect created by the optical members is increased, which improves display quality. Increasing the distance between the light sources and optical members that diffuse light emitted from the light sources may, however, also increase the thickness of the backlight assembly. However, in the above-described display apparatus 500, because the first optical member 100 increases the diffusion effect of the light, a distance between the first optical member 100 and each light source 50 may be equal to or smaller than 10 millimeters, and thus a thickness of the display apparatus 500 may be equal to or smaller than 20 millimeters.

The second optical member 180 is disposed on the first optical member 100. The second optical member 180 may include a plurality of optical films. For instance, the second optical member 180 may include a reflective polarizer 181 that reflects or transmits the light from the first optical member 100 according to the vibration direction of the light, a prism sheet 182 that condenses the light from the reflective polarizer 181 to improve the front brightness of the light, and a diffusion film 183 that diffuses the light from the prism sheet 182.

According to another exemplary embodiment, the second optical member 180 may further include additional optical films having different functions from the above-described optical films, or the same functions as the above-described optical films.

In the present exemplary embodiment, the display panel 400 may be a panel for a liquid crystal display. In a case in which the display panel 400 is the panel for the liquid crystal display, the display panel 400 includes a first substrate 420 employing thin film transistors (not shown) and a second substrate 410 facing the first substrate 420. The first substrate 420 includes a plurality of pixels (not shown) each having a corresponding thin film transistor of the thin film transistors and a pixel electrode (not shown) electrically connected to the corresponding thin film transistor.

The second substrate 410 includes color filters (not shown) positioned in one-to-one correspondence with the pixels. In addition, if the display panel 400 is the panel for the liquid crystal display, the second substrate 410 may include a common electrode (not shown) that forms an electric field with the pixel electrode.

According to another exemplary embodiment, the color filters may be formed on the first substrate 420 instead of the second substrate 410, and also the common electrode may be formed on the first substrate 420, not on the second substrate 410. In the case in which the common electrode is formed on the first substrate 420, the common electrode forms a horizontal electric field in cooperation with the pixel electrode and serves as an opposite electrode to control directors of liquid crystals.

The bottom chassis 350 includes a bottom and inclined surfaces that extend from the bottom to provide a receiving space. The reflection plate 20, the light sources 50, the first optical member 100, and the second optical member 180 are received in the receiving space. In addition, the display panel 400 is disposed on the second optical member 180, and the top chassis 380 is coupled with the bottom chassis 350 to cover the end of the display panel 400.

Figure 3:
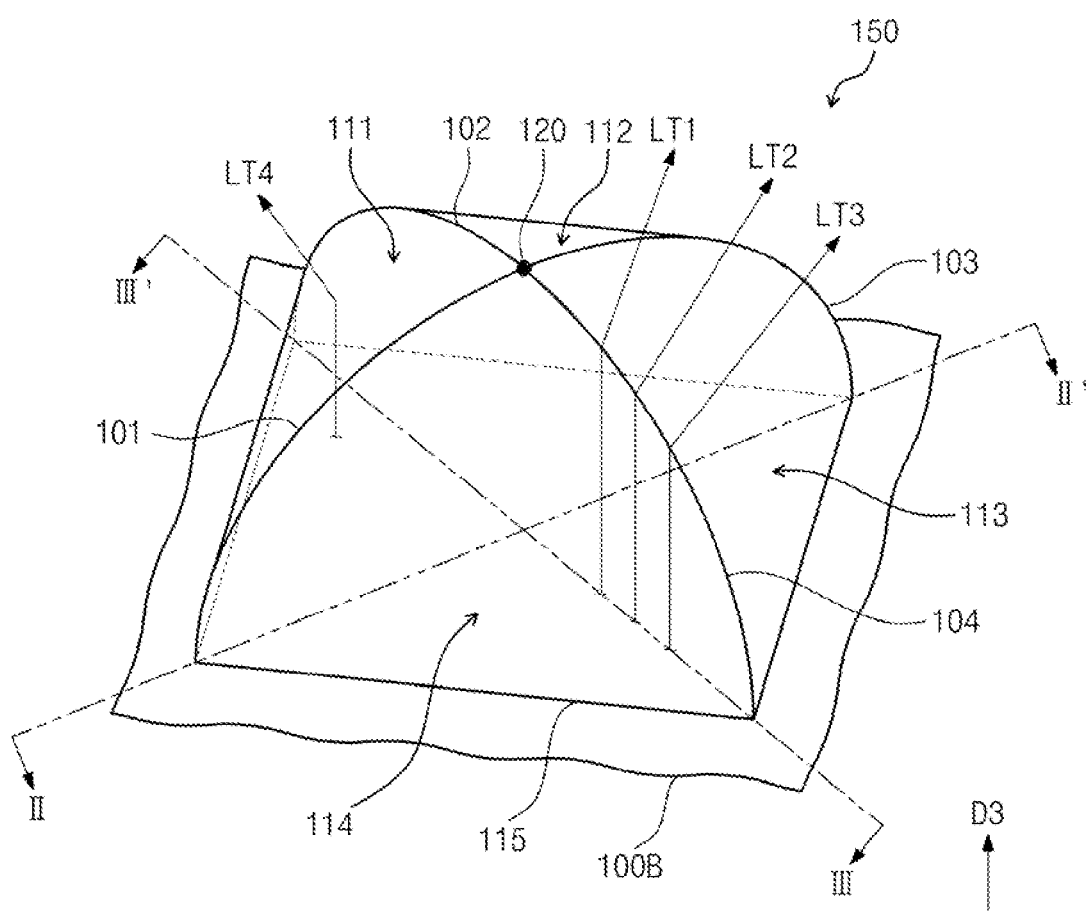
FIG. 3 is a perspective view showing a first diffusion member of FIG. 2.

FIG. 3 is a perspective view showing a first diffusion member 150 of FIG. 2. In FIG. 3, only one first diffusion member 150 has been shown as a representative example since the first diffusion members 150 have the same structure.

Referring to FIG. 3, the first diffusion member 150 includes a bottom surface 115 making contact with the exit surface 100B and first, second, third and fourth inclined surfaces 111, 112, 113, and 114, respectively, extending from the bottom surface 115 and connected at the vertex 120.

The first inclined surface 111 includes a first edge 101 and a second edge 102. The second inclined surface 112 includes a third edge 103 and co-owns the second edge 102 with the first inclined surface 111. The third inclined surface 113 includes a fourth edge 104 and co-owns the third edge 103 with the second inclined surface 112. The fourth inclined surface 114 co-owns the first edge 101 with the first inclined surface 111, and the fourth inclined surface 114 co-owns the fourth edge 104 with the third inclined surface 113.

In the first diffusion member 150 having the above-described structure, the light provided to the first diffusion member 150 after passing through the bottom surface 115 is refracted by the first to fourth inclined surfaces 111, 112, 113, and 114 and the first to fourth edges 101, 102, 103, and 104, thereby changing the path of the light.

In detail, when first, second, and third lights LT1, LT2, and LT3, respectively, traveling toward a third direction D3 are provided to the first diffusion member 150, the first to third lights LT1, LT2, and LT3 are refracted by the fourth edge 104 after passing through the bottom surface 115, and each travels toward a direction that is different from the third direction D3.

Each of the first to fourth edges 101, 102, 103, and 104 has a curved shape. Thus, the lights refracted by the first to fourth edges 101, 102, 103, and 104 after passing through the exit surface 100B may be dispersed in a variety of different directions. For instance, the first to third lights LT1, LT2, and LT3 travel toward the third direction D3 before being refracted by the fourth edge 104, but the first to third lights LT1, LT2, and LT3 each travel in different directions after being refracted by the fourth edge 104. That is, due to the curved shape of the fourth edge 104, the lights passing through the first diffusion member 150 are dispersed in a variety of different directions, thereby increasing the light diffusion effect.

Meanwhile, when a fourth light LT4 traveling toward the third direction D3 reaches the first inclined surface 111 after passing through the bottom surface 115, the fourth light LT4 is refracted by the first inclined surface 111 to travel toward a direction different from the third direction D3 since the first inclined surface 111 is inclined toward the vertex while extending from the bottom surface 115.

Figure 9:
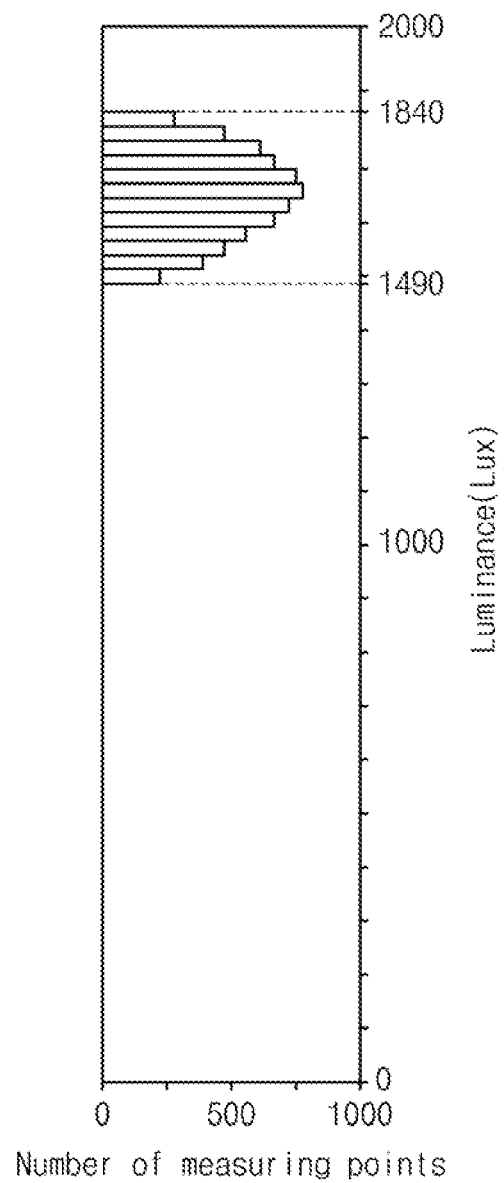
FIG. 9 is a graph showing luminance of a display apparatus of FIG. 1.

The light diffusion effect created by the first diffusion member 150 is shown in FIG. 9. FIG. 9 is a graph showing luminance of a display apparatus of FIG. 1. In FIG. 9, the luminance (lux) has been obtained by measuring the light emitted from a display area having a size of 30 mm×30 mm.

Referring to FIG. 9, an average value of the measured luminance is approximately 1660 lux, a minimum value of the measured luminance is approximately 1490 lux, and a maximum value of the measured luminance is approximately 1840 lux. In other words, the display apparatus 500 employing the first diffusion member 150 may display the image in a luminance difference of about 180 lux to about 350 lux.

Although not shown in FIG. 9, if the first optical member 100 does not include the first diffusion members 150 and the second diffusion members 175, the minimum value of the luminance of the display apparatus may be lowered below 1000 lux, so that the luminance difference may be varied over 700 lux. As the luminance difference of the image displayed on the display apparatus increases, a bright/dark line occurs on the display image due to the luminance difference, thereby causing deterioration in image display quality.

However, in the exemplary embodiments disclosed herein, the display apparatus 500 employing the first optical member 100 may reduce the luminance difference of the displayed image, to thereby minimize deterioration of the image display quality of the display apparatus.

Figure 4:
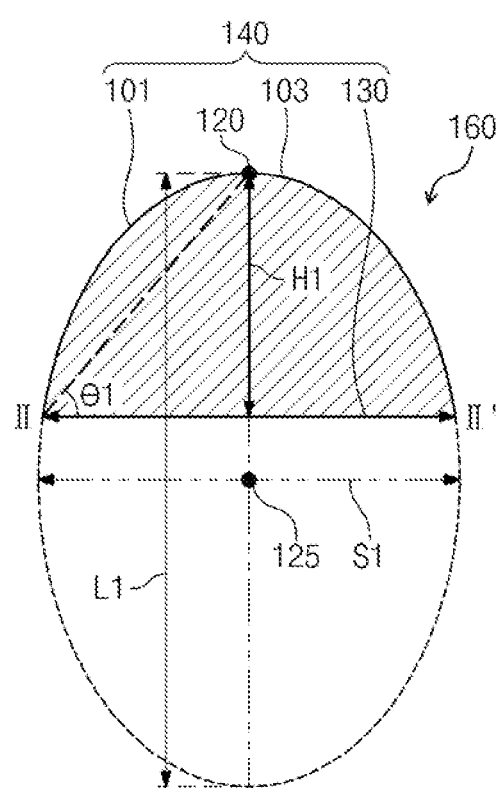
FIG. 4 is a sectional view taken along a line II-II' of FIG. 3.

FIG. 4 is a sectional view taken along a line II-II' of FIG. 3.

Referring to FIG. 4, a cross-section of the first optical member 150, taken along the vertex 120, the first edge 101, and the third edge 103, has a first segment 140.

The first segment 140 is defined by the first edge 101, the third edge 103 connected with the first edge 101 through the vertex 120, and a first chord 130 connecting an end of the first edge 101 to an end of the third edge 103.

In the present exemplary embodiment, the first chord 130 may have a length from about 30 micrometers to about 100 micrometers, and a first straight distance H1 between the vertex 120 and the first chord 130 is from about 15 micrometers to about 50 micrometers.

In addition, a curve defined by the first and third edges 101 and 103 connected with each other through the vertex 120 corresponds to a portion of an elliptical arc of a first ellipse 160 defined by a first major axis L1 and a first minor axis S1 crossing the first major axis L1 at a first center portion 125 of the first ellipse 160. That is, a curvature of the curve defined by the first and third edges 101 and 103 may be defined by a curvature of the elliptical arc of the first ellipse 160.

In the first ellipse 160 according to the present exemplary embodiment, a ratio of a length of the first minor axis S1 to a length of the first major axis L1 is from 1:1 to 1:3. If the ratio of the length of the first minor axis S1 to the length of the first major axis L1 is 1:1, the first ellipse 160 may have a substantially circular shape.

In addition, an angle between a straight line connecting the end of the first edge 101 to the vertex 120 and the first chord 130 is referred to as a first angle $\theta 1$. The first angle $\theta 1$ is from about 20 degree to about 40 degree.

Figure 5:
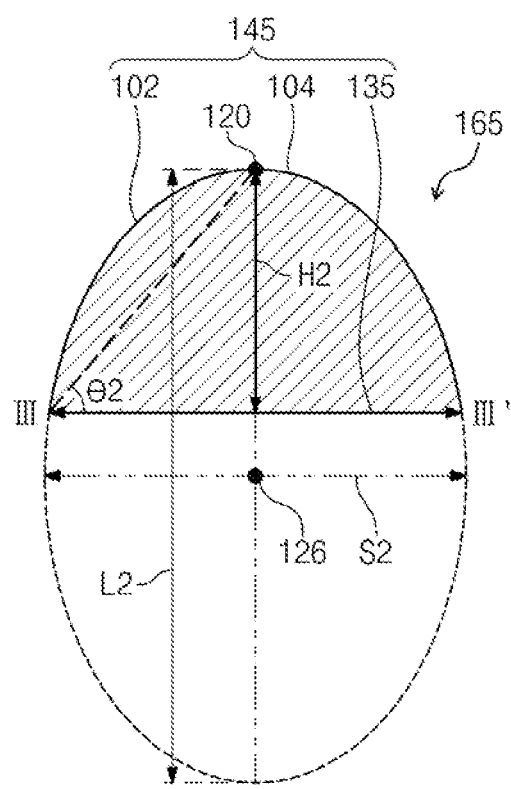
FIG. 5 is a sectional view taken along a line III-III' of FIG. 3.

FIG. 5 is a sectional view taken along a line III-III' of FIG. 3.

Referring to FIG. 5, a cross-section of the first optical member 150, taken along the first edge 101 and the third edge 103, has a second segment 145.

The second segment 145 is defined by the second edge 102, the fourth edge 104 connected with the second edge 102 through the vertex 120, and a second chord 135 connecting an end of the second edge 102 to an end of the fourth edge 104.

In the present exemplary embodiment, the second chord 135 may have a length from about 30 micrometers to about 100 micrometers, and a second straight distance H2 between the vertex 120 and the second chord 135 is from about 15 micrometers to about 50 micrometers.

In addition, a curve defined by the second and fourth edges 102 and 104 connected with each other through the vertex 120 corresponds to a portion of an elliptical arc of a second ellipse 165 defined by a second major axis L2 and a second minor axis S2 crossing the second major axis L2 at a second center portion 126 of the second ellipse 165. That is, a curvature of the curve defined by the second and fourth edges 102 and 104 may be defined by a curvature of the elliptical arc of the second ellipse 165.

In the second ellipse 165 according to the present exemplary embodiment, a ratio of a length of the second minor axis S2 to a length of the second major axis L2 is from 1:1 to 1:3. If the ratio of the length of the second minor axis S2 to the length of the second major axis L2 is 1:1, the second ellipse 165 may have a substantially circular shape.

In addition, an angle between a straight line connecting the end of the second edge 102 to the vertex 120 and the second chord 135 is referred to as a second angle $\theta 2$. The second angle $\theta 2$ is from about 20 degree to about 40 degree.

Referring again to FIG. 3, the cross-section of the first diffusion member 150, which is taken along the line II-II', is the same as the first segment 140, and the elliptical arc of the first segment 140 is the same as the portion of the elliptical arc of the first ellipse 160. In addition, the cross-section of the first diffusion member 150, which is taken along the line III-III', is the same as the second segment 145, and the elliptical arc of the second segment 145 is the same as the portion of the elliptical arc of the second ellipse 160.

In the present exemplary embodiment, because the first segment 140 is substantially same as the second segment 145, the first ellipse 160 is substantially same as the second ellipse 165. However, it should not be limited thereto or thereby, and thus the first segment 140 may be designed to have a shape that is different from that of the second segment 145.

Figure 6:
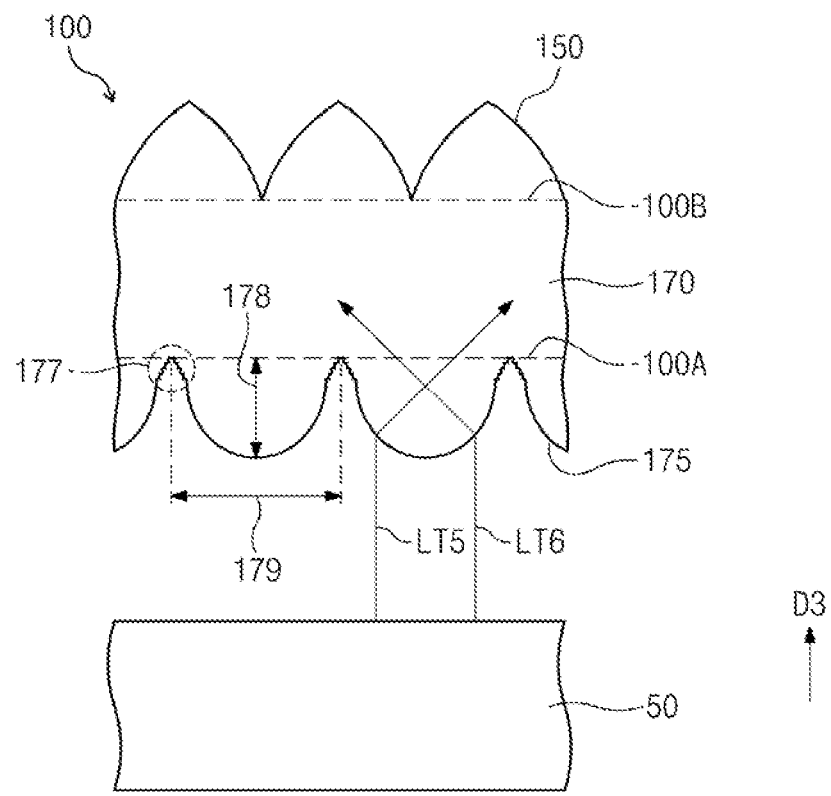
FIG. 6 is a partially enlarged view showing a first optical member of FIG. 2.

FIG. 6 is a partially enlarged view showing a first optical member of FIG. 2.

Referring to FIG. 6, the second diffusion member 175 is provided on the incident surface 100A of the first optical member 100. The second diffusion member 175 has the embossed shape protruding from the incident surface 100A.

In the present exemplary embodiment, the second diffusion member 175 has a surface making contact with the incident surface 100A, and the surface of the second diffusion member 175 has a width 179 of about 30 micrometers to about 100 micrometers. In addition, the second diffusion member 175 protruding from the incident surface 100A has a height 178 of about 10 micrometers to about 40 micrometers.

The light emitted from the light sources 50 and traveling toward the first optical member 100 is refracted at the surface of the second diffusion member 175, so that the direction the light travels is varied. For instance, a fifth light LT5 and a sixth light LT6, which are emitted from the light sources 50 to travel toward the third direction D3, are refracted by the curved surface of the second diffusion member 175 to travel toward directions different from the third direction D3.

The light emitted from the light sources 50 that travels toward the third direction D3 is vertically emitted from the light sources 50. Accordingly, the second diffusion member 175 disperses the traveling path of the light substantially vertically emitted from the light sources 50, and as a result, the light diffusion effect of the light emitted from the light sources 50 is increased by the second diffusion member 175.

Meanwhile, as shown in FIG. 6, a fine concavo-convex pattern 177 may be formed in a valley positioned between two second diffusion members that are adjacent to each other. The fine concavo-convex pattern 177 scatters the lights traveling toward the valley in a variety of directions, thereby preventing a moiré phenomenon caused by optical interference.

Figure 7B:
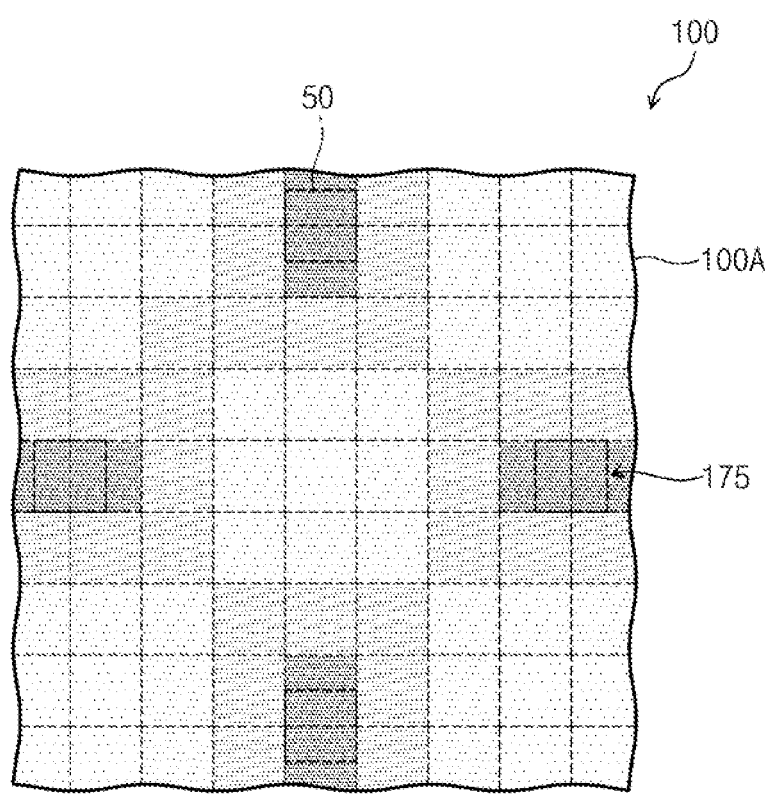
FIG. 7B is a partially enlarged plan view showing a first optical member.

FIG. 7A is a partially enlarged plan view showing a reflection plate provided with light sources, and FIG. 7B is a partially enlarged plan view showing a first optical member.

Referring to FIGS. 7A and 7B, the light sources 50 are arranged on the reflection plate 20. The light sources 50 are arranged in the first direction D1 and the second direction D2, which is substantially perpendicular to the first direction D1, and are spaced apart from each other. In particular, the light sources 50 are spaced apart from each other by a first interval 51 in the first direction D1 and spaced apart from each other by a second interval 52 in the second direction D2.

As described with reference to FIG. 6, the second diffusion member 175 protrudes from the incident surface 100A to have an embossed shape, and the number of the second diffusion members 175 provided on the incident surface 100A depends on the positions of the light sources 50.

Hereinafter, the number of the second diffusion members 175 will be described as a pattern density.

In the present exemplary embodiment, for example, the first interval 51 and the second interval 52 may be approximately 25 millimeters and 28 millimeters, respectively. When each of the first and second intervals 51 and 52 are divided into seven equal parts, a rectangular area defined by the first and second intervals 51 and 52 is divided into forty-nine lattice areas 55. Thus, each lattice area 55 has a long side of about 4 millimeters and a short side of about 3.57 millimeters.

When the pattern density is defined by the number of the second diffusion members 175 provided in each lattice area 55, the pattern density becomes a maximum at the lattice areas that overlap the light sources 50, and becomes a minimum at the lattice areas that overlap the area between two light sources. For instance, assuming that the pattern density at the lattice areas overlapped with the light sources 50 is 1, the pattern density at the lattice areas overlapped between two light sources adjacent to each other is about 0.2. In addition, the pattern density gradually increases from 0.2 to 1 from the center of the lattice areas that overlap the area between two light sources to the lattice areas that overlap with the light sources. In other words, the second diffusion members 175 are spaced farther apart in the lattice areas that overlap a center of the area between two light sources, and become closer together as the lattice areas become nearer to a center of the lattice areas that overlap with the light sources 50.

Figure 8:
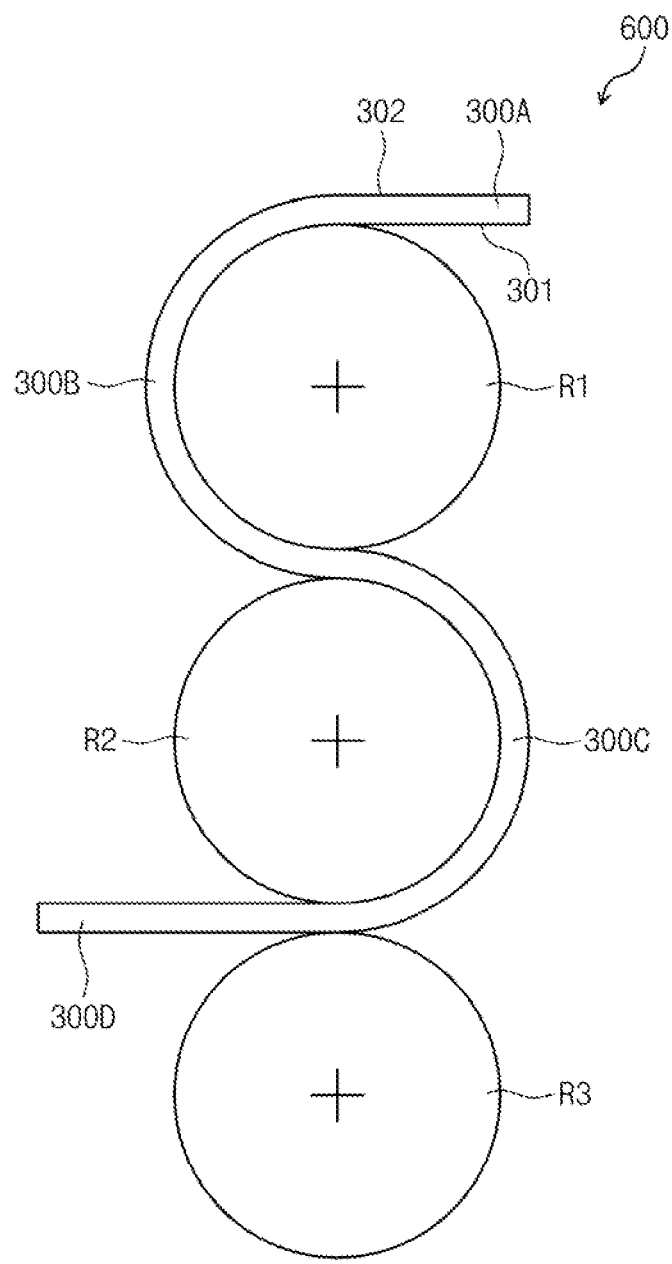
FIG. 8 is a view illustrating a method of fabricating a first optical member of FIG. 2.

FIG. 8 is a view illustrating a method of fabricating a first optical member of FIG. 2.

Referring to FIG. 8, an extrusion molder 600 includes a first roller R1, a second roller R2, and a third roller R3, which are arranged vertically one above another.

In order to manufacture the first optical member 100 using the extrusion molder 600, a polymer resin 300A in a molten state is provided to the first roller R1. The polymer resin 300A includes a first surface 301 and a second surface 302 opposite to the first surface 301.

When the polymer resin 300A is provided to the first roller R1, the first and second rollers 301 and 302 are rotated in mutually opposite directions to pressurize the polymer resin 300A, so that the first diffusion members 150 (shown in FIG. 2) are formed on the first surface 301 by a pattern (not shown) formed on a surface of the first roller R1. As a result, a first preliminary plate 300B is formed, having the first diffusion members formed on the first surface 301. The pattern formed on the surface of the first roller R1 may have a recessed shape to oppositely correspond to the shape of the first diffusion members.

Then, the second diffusion members 175 (shown in FIG. 2) are formed on the second surface 302 of the polymer resin 300A by a pattern (not shown) formed on a surface of the second roller R2. As a result, a second preliminary plate 300C is formed, having the second diffusion members formed on the second surface 302. The pattern formed on the surface of the second roller R2 may have a recessed shape to oppositely correspond to the shape of the second diffusion member.

Next, the second and third rollers R2 and R3 are rotated in mutually opposite direction to pressurize the second preliminary plate 300C. Thus, the fine concavo-convex pattern 177 (shown in FIG. 6) is formed on the second surface 302 by a plurality of beads (not shown) formed on a surface of the third roller R3. As a result, a third preliminary plate 300D is formed, having the fine concavo-convex pattern formed after the second diffusion members are formed.

Then, the third preliminary plate 300D is cured and is cut into the desired size, thereby completely manufacturing the first optical member 100.

Although exemplary embodiments have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
a light source that generates light; and
a first optical member,
wherein the first optical member comprises:
a body having a shape of a plate, the body including an incident surface to which the light is incident and an exit surface facing the incident surface, from which the light exits; and
a first diffusion member disposed on the exit surface to diffuse the light, the first diffusion member having an embossed shape that protrudes from the body,
wherein the first diffusion member comprises:
at least three inclined surfaces, wherein the at least three inclined surfaces meet at a single vertex, each of the at least three surfaces is inclined with respect to a flat portion of the exit surface, and each of the at least three inclined surfaces includes two edges;
wherein the two edges of each inclined surface extend between the exit surface and the single vertex spaced apart from the exit surface and have a curved shape, and the inclined surfaces are flat between any points on the two edges that are equidistant from the exit surface.

2. The backlight assembly of claim 1, wherein the first diffusion member has a plurality of bottom surface that is in contact with the exit surface, and each side of the bottom surface meets lower end of each of the inclined surfaces.

3. The backlight assembly of claim 2, wherein the edges comprise a first edge, a second edge, a third edge, and a fourth edge, and the inclined surfaces comprise:
a first inclined surface comprising the first and second edges;
a second inclined surface comprising the third edge and co-owning the second edge with the first surface;
a third inclined surface comprising the fourth edge and co-owning the third edge with the second surface; and
a fourth inclined surface co-owning the first edge with the first surface and co-owning the fourth edge with the third surface, and
the first to fourth edges have the curved shape.

4. The backlight assembly of claim 3, wherein the first diffusion member comprising the first and third edges has a cross-section in a first segment that is defined by an elliptical arc of a first ellipse, which includes the first and third edges, and a chord connecting both ends of the elliptical arc of the first ellipse, and the first diffusion member comprising the second and fourth edges has a cross-section in a second segment that is defined by an elliptical arc of a second ellipse, which includes the second and fourth edges, and a chord connecting both ends of the elliptical arc of the second ellipse.

5. The backlight assembly of claim 4, wherein a ratio of a minor axis of the first ellipse to a major axis of the ellipse is 1:1 to 1:3, and a ratio of a minor axis of the second ellipse to a major axis of the ellipse is 1:1 to 1:3.

6. The backlight assembly of claim 4, wherein the first segment has a same shape as the second segment.

7. The backlight assembly of claim 4, wherein the chord of each of the first and second segments has a length of about 30 micrometers to about 100 micrometers, a straight distance between the vertex and the chord of the first segment is equal to or smaller than about 15 micrometers to about 50 micrometers, and a straight distance between the vertex and the chord of the second segment is equal to or smaller than about 15 micrometers to about 50 micrometers.

8. The backlight assembly of claim 1, wherein the light source comprises a plurality of point light sources spaced apart from each other.

9. The backlight assembly claim 8, wherein each of the point light sources is a light emitting diode.

10. The backlight assembly of claim 8, wherein two point light sources adjacent to each other and arranged in a first direction are spaced apart from each other by a distance of about 25 millimeters, and two point light sources adjacent to each other and arranged in a second direction substantially perpendicular to the first direction are spaced apart from each other by a distance of about 28 millimeters, and a distance between the first optical member and each of the point light sources is equal to or smaller than 10 millimeters.

11. The backlight assembly of claim 1, further comprising a second diffusion member that has a shape that protrudes from the incident surface to diffuse the light.

12. The backlight assembly of claim 11, wherein the incident surface comprises a first area corresponding to an area on the incident surface covered by each point light source and a second area corresponding an area on the incident surface between two point light sources adjacent to each other, and the second diffusion members are spaced farther apart in the second area than in the first area, and a space between each second diffusion member is greatest in a center of the second area and decreases toward the first area.

13. The backlight assembly of claim 1, further comprising a second optical member facing the light source while interposing the first optical member between the light source and the second optical member,
wherein the second optical member comprises:
a reflective polarizer that reflects or transmits the light from the light source according to a vibration direction of the light;
a prism sheet that condenses the light from the reflective polarizer; and
a diffusion sheet that diffuses the light provided through the prism sheet.

14. The backlight assembly of claim 1, wherein each of the inclined surfaces has a predetermined curvature.

15. A display apparatus comprising:
a backlight assembly comprising a light source that generates a light and a first optical member that diffuses the light; and
a display panel receiving the light from the backlight assembly to display an image,
wherein the first optical member comprises:
a body having a shape of a plate, the body including an incident surface to which the light is incident and an exit surface facing the incident surface, from which the light exits; and
a first diffusion member disposed on the exit surface to diffuse the light, the first diffusion member having an embossed shape that protrudes from the body,
wherein the first diffusion member comprises:
at least three inclined surfaces, wherein the at least three inclined surfaces meet at a single vertex, each of the at least three surfaces is inclined with respect to a flat portion of the exit surface, and each of the at least three inclined surfaces includes two edges;
wherein the two edges of each inclined surface extend between the exit surface and the vertex spaced apart from the exit surface and have a curved shape, and the inclined surfaces are flat between any points on the two edges that are equidistant from the exit surface.

16. The display apparatus of claim 15, wherein the first diffusion member has a plurality of bottom surface that is in contact with the exit surface, and each side of the bottom surface meets lower end of each of the inclined surfaces.

17. The display apparatus of claim 16, wherein the edges comprise a first edge, a second edge, a third edge, and a fourth edge, and the inclined surfaces comprise:
a first inclined surface comprising the first and second edges;
a second inclined surface comprising the third edge and co-owning the second edge with the first surface;
a third inclined surface comprising the fourth edge and co-owning the third edge with the second surface; and
a fourth inclined surface co-owning the first edge with the first surface and co-owning the fourth edge with the third surface, and
the first to fourth edges have the curved shape.

18. The display apparatus of claim 17, wherein the first diffusion member comprising the first and third edges has a cross-section in a first segment that is defined by an elliptical arc of a first ellipse, which includes the first and third edges, and a chord connecting both ends of the elliptical arc of the first ellipse, the first diffusion member comprising the second and fourth edges has a cross-section in a second segment that is defined by an elliptical arc of a second ellipse, which includes the second and fourth edges, and a chord connecting both ends of the elliptical arc of the second ellipse, a ratio of a minor axis of the first ellipse to a major axis of the ellipse is 1:1 to 1:3, and a ratio of a minor axis of the second ellipse to a major axis of the ellipse is 1:1 to 1:3.

19. The display apparatus of claim 15, wherein the light source comprises a plurality of point light sources spaced apart from each other.

20. The display apparatus of claim 19, further comprising a second diffusion member that has a shape that protrudes from the incident surface to diffuse the light, wherein the incident surface comprises a first area corresponding to an area on the incident surface covered by each point light source and a second area corresponding to an area on the incident surface between two point light sources adjacent to each other, and the second diffusion members are spaced farther apart in the second area than in the first area and a space between each second diffusion member is greatest in a center of the second area and decreases toward the first area.

* * * * *